(12) United States Patent (10) Patent No.: US 12,608,961 B2

Lin et al. (45) Date of Patent: Apr. 21, 2026

(54) LICENSE PLATE IDENTIFICATION SYSTEM AND METHOD THEREOF

(71) Applicant: ioNetworks INC., New Taipei (TW)

(72) Inventors: Ting Lin, New Taipei (TW); Chih-Hung Wang, New Taipei (TW); Ming-Hsiao Yao, New Taipei (TW); Kuan-Chieh Wang, New Taipei (TW); Szu-Tien Yu, New Taipei (TW)

(73) Assignee: IONETWORKS INC., New Taipei City (TW)

( * ) Notice: Subject to any disclaimer, the term of this patent is extended or adjusted under 35 U.S.C. 154(b) by 308 days.

(21) Appl. No.: 18/242,500

(22) Filed: Sep. 5, 2023

(65) Prior Publication Data

US 2025/0078537 A1 Mar. 6, 2025

(51) Int. Cl.
*G06V 20/62* (2022.01)
*G06V 10/82* (2022.01)

(52) U.S. Cl.
CPC ............ *G06V 20/625* (2022.01); *G06V 10/82* (2022.01)

(58) Field of Classification Search
CPC ....... G06V 20/625; G06V 10/82; G06V 20/62
See application file for complete search history.

(56) References Cited

U.S. PATENT DOCUMENTS

| | | | | |
|---|---|---|---|---|
| 10,755,120 | B2 * | 8/2020 | Fu | G06V 10/82 |
| 11,776,276 | B1 * | 10/2023 | Muron | G06V 10/764 |
| | | | | 382/100 |
| 2018/0300578 | A1 * | 10/2018 | Wilbert | G08G 1/0175 |
| 2019/0251369 | A1 * | 8/2019 | Popov | G06V 20/54 |
| 2020/0082196 | A1 * | 3/2020 | Georgis | G06N 3/08 |
| 2021/0182077 | A1 * | 6/2021 | Chen | G06F 9/445 |
| 2021/0183373 | A1 * | 6/2021 | Moritz | G06N 3/09 |
| 2021/0326631 | A1 * | 10/2021 | Chaudhary | G06F 18/214 |
| 2022/0199071 | A1 * | 6/2022 | Voss | G10L 15/02 |
| 2024/0249716 | A1 * | 7/2024 | Malik | G10L 15/197 |

OTHER PUBLICATIONS

IET (Efficient and unified license plate recognition via lightweight deep neural network) (Year: 2020).*

* cited by examiner

*Primary Examiner* — Solomon G Bezuayehu

(74) *Attorney, Agent, or Firm* — Chun-Ming Shih; LANWAY IPR SERVICES

(57) ABSTRACT

The present invention relates to a license plate identification system and method thereof. The license plate identification system comprises at least a server apparatus storing at least one license plate picture file to be identified and a plurality of license plate sample picture files. Each of the license plate sample picture files has a double-row of character. Through deep learning training, the system generates a neural network model, inputs the license plate picture file to be identified into the neural network model for outputting analysis result information, and decodes the analysis result information through a decoding algorithm to obtain an identification license plate character content.

6 Claims, 7 Drawing Sheets

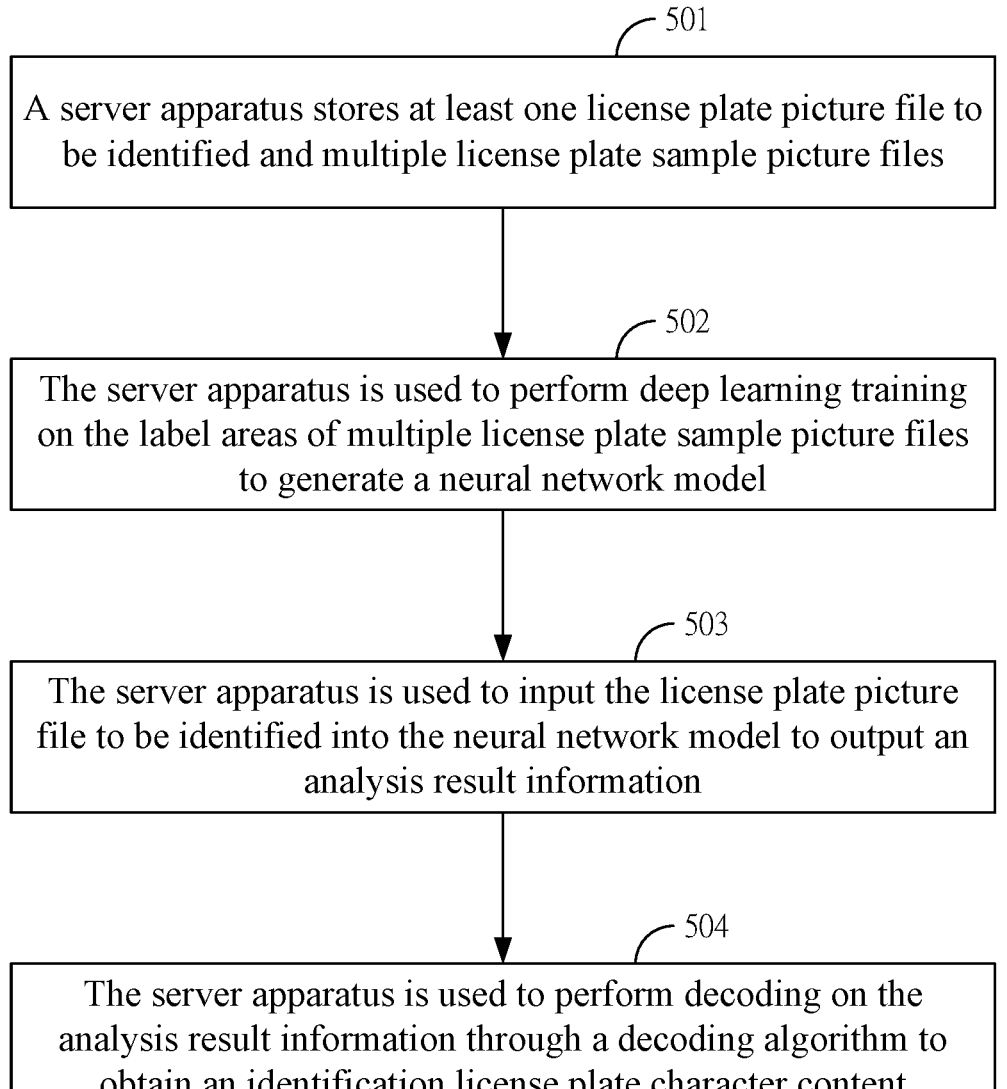

501

A server apparatus stores at least one license plate picture file to be identified and multiple license plate sample picture files

502

The server apparatus is used to perform deep learning training on the label areas of multiple license plate sample picture files to generate a neural network model

503

The server apparatus is used to input the license plate picture file to be identified into the neural network model to output an analysis result information

504

The server apparatus is used to perform decoding on the analysis result information through a decoding algorithm to obtain an identification license plate character content

FIG.5

LICENSE PLATE IDENTIFICATION SYSTEM AND METHOD THEREOF

BACKGROUND OF THE INVENTION

Field of the Invention

The present invention relates to a license plate identification system and method thereof, in particular to an identification system and method capable of identifying a license plate with double-row characters.

Description of the Related Art

In general, there will be a license plate code (license plate number) on the license plate. Due to the limitation of the license plate specification, double-row license plates often occur. For the conventional method of identifying license plates with double-row characters, it is generally required to locate the position of the characters first. Afterwards, the OCR identification module is used to identify characters in different positions, and then concatenate the identification results in different positions to obtain the final identification result.

However, traditionally, for this type of license plate with double-row characters, it is often necessary to mark the upper and lower rows of characters separately and then identify them separately. This is a very time-consuming approach. However, it is traditionally difficult to mark the double-row characters to perform identification, and there is often a problem of decreased identification rate. Accordingly, if the problem is overcome, the time and cost spent on identification will be effectively reduced.

Therefore, a relatively deep neural network is used as the backbone in the subject application. Through the training process, the network not only extracts character features from images, but also rearranges the image character features of double rows (or image character features of single row) to a certain extent, so that its feature map sequentially arranges the character features in the image, which can be processed in a recognizable way when entering the final output layer to identify the contents of the license plate characters. Therefore, the present invention should be an optimum solution.

BRIEF SUMMARY OF THE INVENTION

The license plate identification system of the present invention includes: at least one server apparatus, including at least: a license plate data storage module, storing at least one license plate picture file to be identified and a plurality of license plate sample picture files, wherein each of the license plate sample picture files comprises a label area, and image content of the label area is an image character feature, the image character feature is a double-row character or a single-row character; a neural network learning module, connected to the license plate data storage module, used to perform deep learning training on the label area of the plurality of license plate sample picture files to generate a neural network model; a license plate identification module, connected to the license plate data storage module and the neural network learning module, used to input the license plate picture file to be identified into the neural network model for outputting an analysis result information; and a decoding output module, connected to the license plate identification module, used to perform decoding on the analysis result information through a decoding algorithm for obtaining an identification license plate character content.

More specifically, the identification license plate character content corresponds to license plate code on the license plate picture file to be identified, and the license plate code is the single-row character or the double-row character.

More specifically, the decoding algorithm is an avaricious algorithm (Greedy algorithm) or a directional search algorithm (Beam Search).

More specifically, the neural network model comprises at least a plurality of convolutional layers and a deconvolutional layer, wherein the plurality of convolutional layers image extract image content of the label area as a feature map for rearranging character features in the image content, and the deconvolution layer is used to amplify the feature map to increase upper limit of identifying string length, wherein the feature map corresponds to having a plurality of time feature regions.

More specifically, the deconvolution layer is connected to a character feature extraction layer, the character feature extraction layer extracts a character feature matrix for each time feature region of the feature map based on a plurality of character types, and the character feature matrix at least comprises an output channel quantity information, a vertical direction feature information and a horizontal direction feature information, wherein the output channel quantity information is a character type quantity, wherein the vertical direction feature information is height of the time feature region, and wherein the horizontal direction feature information is width of the time feature region.

More specifically, the character feature extraction layer is connected to an average dimension reduction layer, and the average dimension reduction layer is used to obtain an average value of all vertical direction feature information of the character feature matrix to output a dimension reduction character feature matrix.

More specifically, the average dimension reduction layer is connected to an output layer, the output layer processes the dimension reduction character feature matrix through a connectionist temporal classification method to output the analysis result information, and the decoding output module identifies each time feature region as a character through the decoding algorithm and removes consecutive characters and blanks to obtain the identification license plate character content.

A license plate identification method includes the steps of:
(1) storing at least one license plate picture file to be identified and a plurality of license plate sample picture files by a server apparatus, wherein the license plate sample picture files comprise a label area, image content of the label area is an image character feature, and the image character feature is a double-row character;
(2) performing deep learning training on the label area of the plurality of license plate sample picture files by the server apparatus to generate a neural network model;
(3) inputting the license plate picture file to be identified into the neural network model by the server apparatus to output an analysis result information; and
(4) performing decoding on the analysis result information through a decoding algorithm by the server apparatus to obtain an identification license plate character content.

More specifically, the neural network model comprises at least a plurality of convolution layers, a deconvolution layer, a character feature extraction layer, an average dimension reduction layer and an output layer, the plurality of convolutional layer extract image content of the label area as a feature map having a plurality of time feature regions to rearrange character features in the image content, the deconvolution layer is used to amplify the feature map, the character feature extraction layer is used to extract a character feature matrix for each time feature region of the feature map, the average dimension reduction layer is used to reduce dimension of the character feature matrix and output a dimension reduction character feature matrix, and the output layer processes the dimension reduction character feature matrix through a connectionist temporal classification method to output the analysis result information, then identifies each time feature region as a character through the decoding algorithm, and removes consecutive characters and blanks to obtain the identification license plate character content.

BRIEF DESCRIPTION OF THE DRAWINGS

FIG. 5 is a schematic flow chart of the license plate identification system and its method of the present invention.

DETAILED DESCRIPTION OF THE INVENTION

Other technical contents, features and effects of the present invention will be clearly presented in the following detailed description of the preferred embodiment with reference to the drawings.

Figure 1:
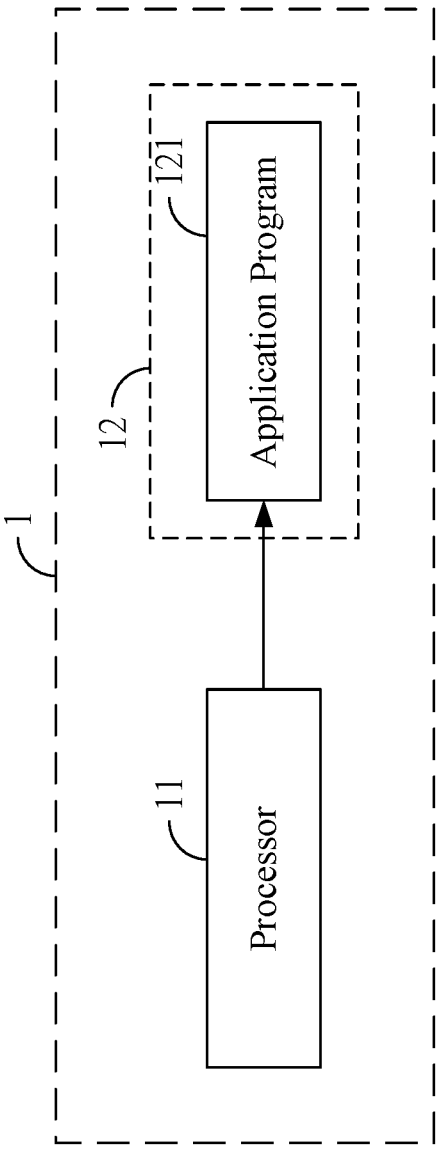
FIG. 1 is a schematic diagram of the overall structure of the license plate identification system and its method of the present invention.

Please refer to FIG. 1, which is a schematic diagram of the overall structure of the license plate identification system and its method of the present invention. As can be seen from the figure, the server apparatus 1 includes at least one processor 11 and at least one computer-readable recording medium 12. The computer-readable recording medium 12 stores at least one application program 121. The computer-readable recording medium 12 further stores computer-readable instructions. When the computer-readable instructions are executed by the processor 11, the application program 121 can be operated accordingly.

Figure 2:
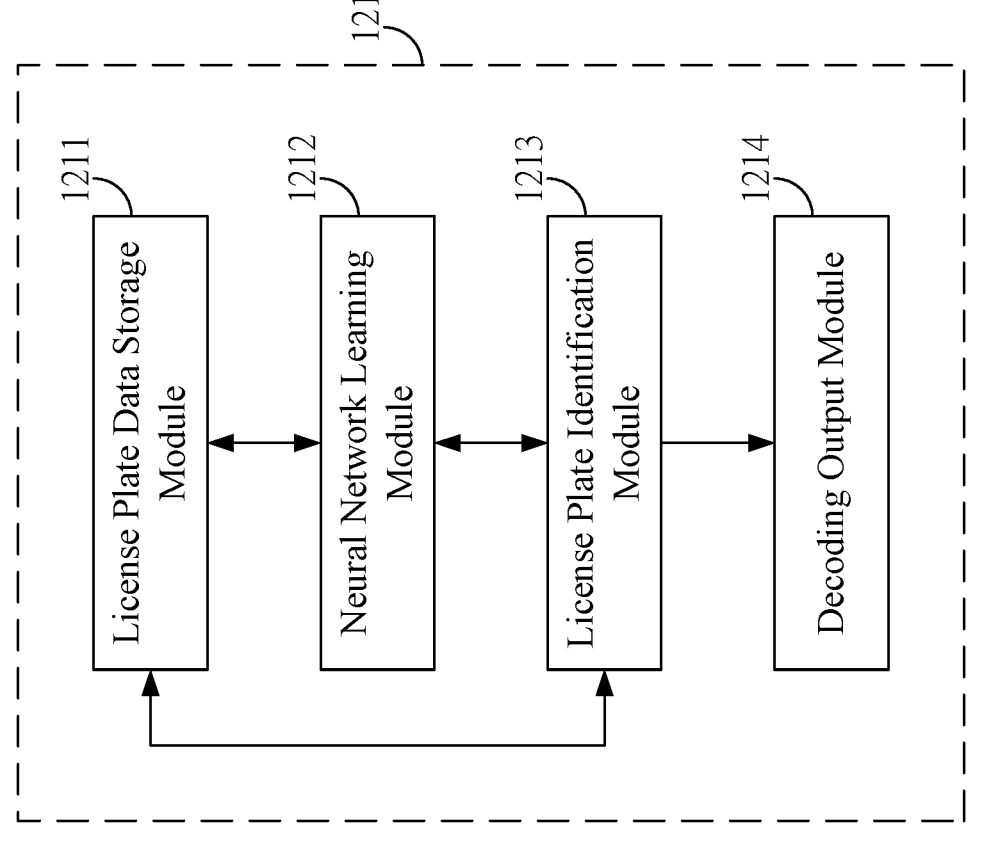
FIG. 2 is a schematic diagram of the application program of the license plate identification system and its method of the present invention.

As shown in FIG. 2, the application program 121 includes a license plate data storage module 1211, a neural network learning module 1212, a license plate identification module 1213 and a decoding output module 1214.

Figure 3:
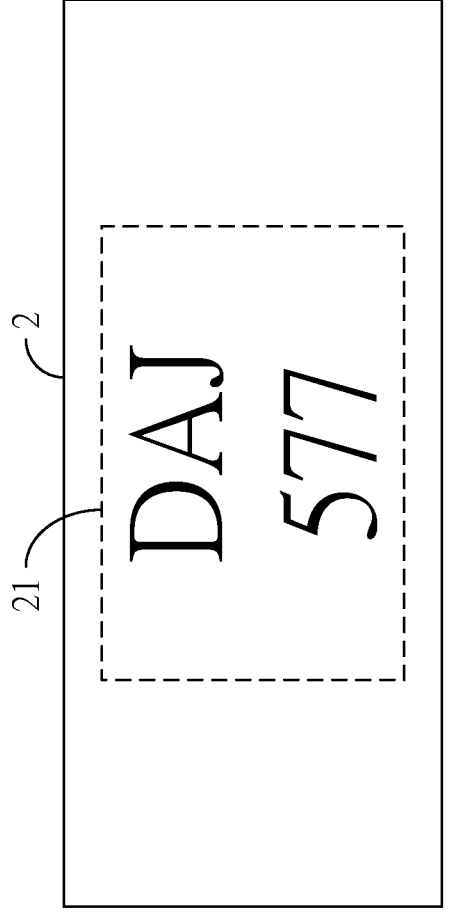
FIG. 3 is a schematic diagram of the image content of the license plate sample picture file of the license plate identification system and its method of the present invention.

The license plate data storage module 1211 stores at least one license plate picture file to be identified and a plurality of license plate sample picture files (the license plate sample picture files are used as data sets for deep learning training). As shown in FIG. 3, the license plate sample picture file has a license plate body 2, and the surface of the license plate body 2 has a label area 21. The image content of the label area 21 is an image character feature, and the image character feature is a double-row character or a single-row character. In the subject application, license plate images with single-row characters and license plate images with double-row characters are used for training.

The identification license plate character content corresponds to the license plate code on the license plate picture file to be identified. The license plate code is a single-row character or a double-row character, wherein each license plate includes at least 6 characters.

Figure 4A:
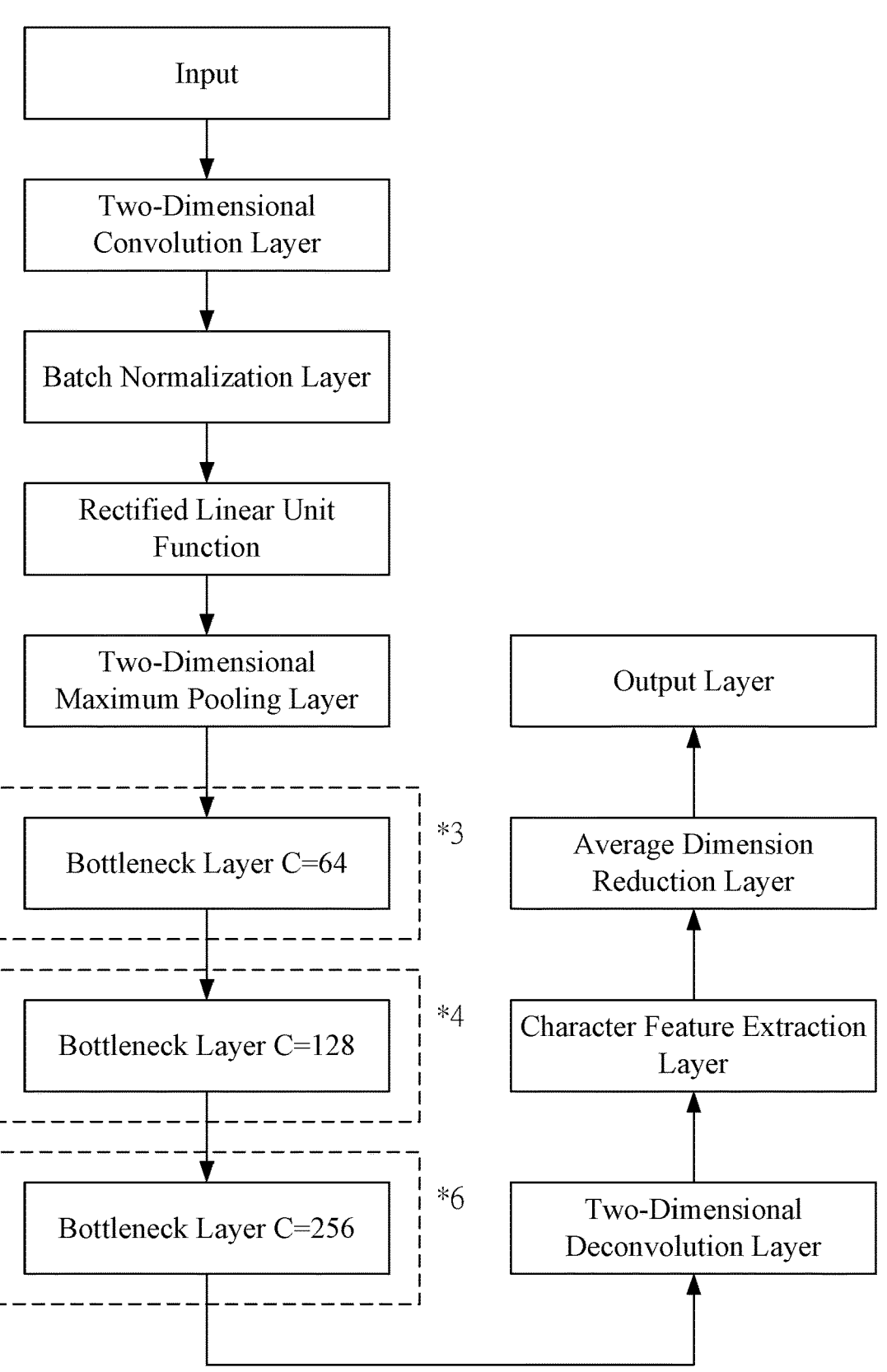
FIG. 4A is a schematic diagram of the network architecture of the neural network model of the license plate identification system and its method of the present invention.
Figure 4B:
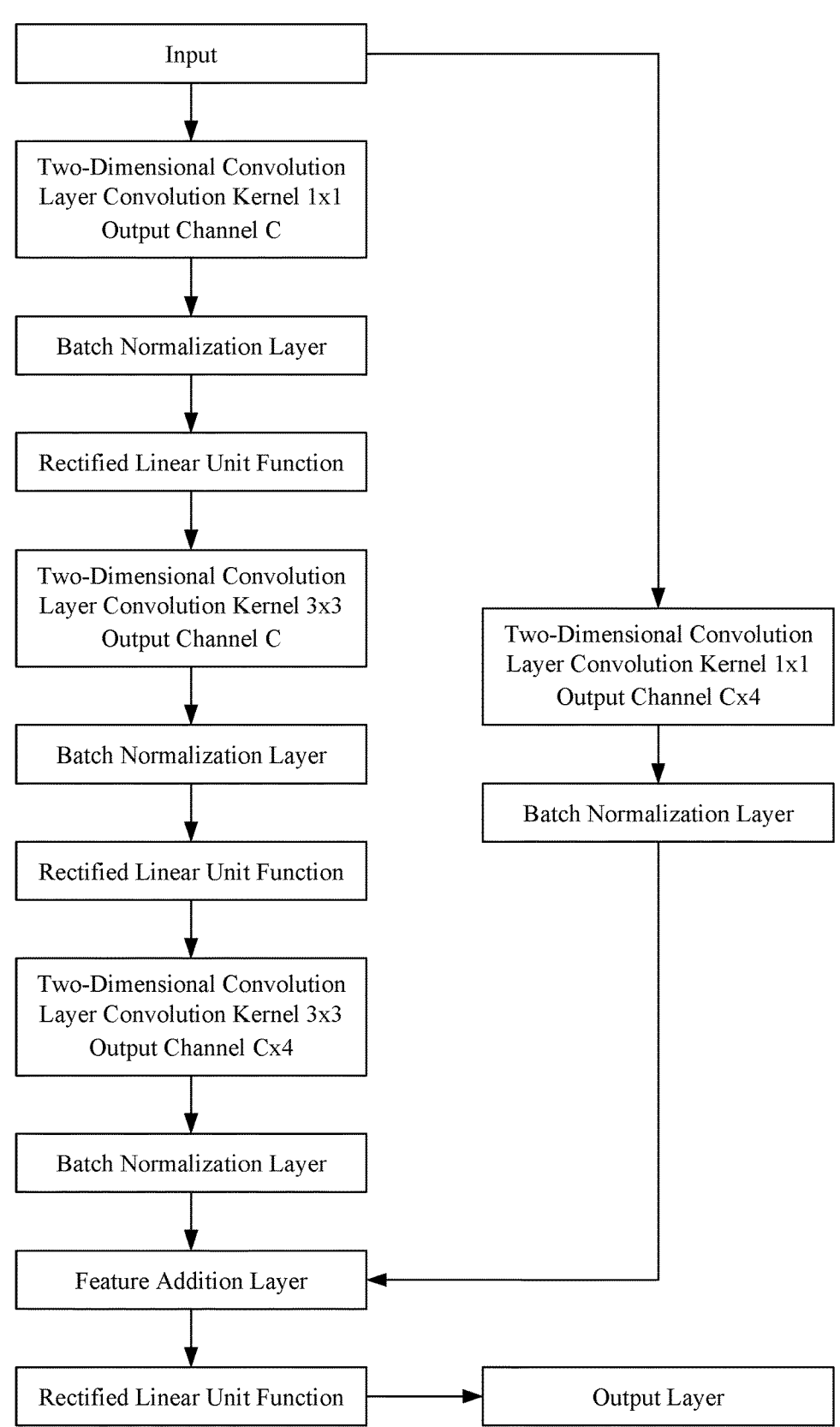
FIG. 4B is a schematic diagram of the network architecture of the bottleneck layer of the neural network model of the license plate identification system and its method of the present invention.
Figure 4C:
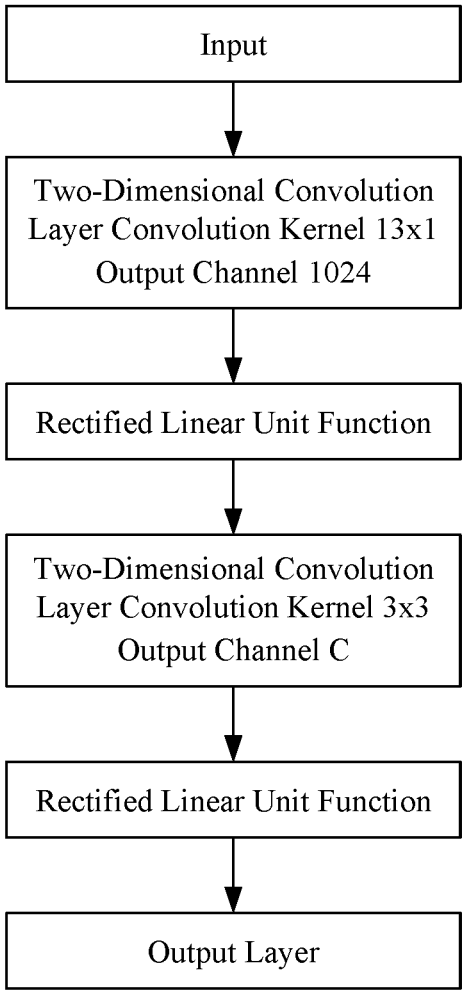
FIG. 4C is a schematic diagram of the network architecture of the character feature extraction layer of the neural network model of the license plate identification system and its method of the present invention.

The neural network learning module 1212 is connected to the license plate data storage module 1211, and is used to perform deep learning training on the label areas of multiple license plate sample picture files to generate a neural network model. As shown in FIGS. 4A, 4B and 4C, in the embodiment, a neural network with resnet50 as the backbone is constructed to train the neural network.

When the license plate sample picture file is input to the neural network learning module 1212, the input size of the neural network is 240 pixels in width and 96 pixels in height, and the input dimension is 1×3×96×240. Through the processing of the neural network, the network output layer matrix is obtained, and the output layer dimension is 1×36×30.

In the embodiment, the set of image character features is numbers 0~9, English capital letters AZ except I, O and dash (-), which is a total of 36 kinds of characters but not limited thereto. Different types of characters can also be applied to the technical architecture of the present application.

In the embodiment, resnet50 is used as the backbone (the backbone of the subject application is not limited to resnet50, and the lighter resnet34 can also be used). The front N layers of convolutional layers are reserved as feature extractors for images (input→two-dimensional convolution layer (conv2D)→batch normalization layer (BN)→rectified linear unit function (ReLU)→two-dimensional maximum pooling layer (MaxPooling2D)→bottleneck layer C=64 (bottleneck layer)→bottleneck layer C=128 (bottleneck layer)→bottleneck layer C=256 (bottleneck layer)), wherein *3, *4, *6 next to the dotted line box represent that the block is repeated 3 times, 4 times, and 6 times.

The image content of the label area can be extracted as a feature map through the above multiple convolutional layers, so as to rearrange character features in the image content.

As shown in FIG. 4B, it is the bottleneck layer in the network architecture schematic (input→two-dimensional convolution layer (conv2D) convolution kernel 1×1 output channel C→batch normalization layer (BN)→rectified linear unit function (ReLU)→two-dimensional convolution layer (conv2D) convolution kernel 3×3 output channel C→batch normalization layer (BN)→rectified linear unit function (ReLU)→two-dimensional convolution layer (conv2D) convolution kernel 3×3 output channel Cx4→batch normalization layer (BN)→feature addition layer (Add)→rectified linear unit function (ReLU)→output layer (Output) (input→two-dimensional convolution layer (conv2D) convolution kernel 1×1 output channel Cx4→batch normalization layer (BN)→feature addition layer (Add)).

Continuing with FIG. 4A, a two-dimensional deconvolution layer (TransposConv2d), a character feature extraction layer, an average dimension reduction layer (ReduceMean), and an output layer (Output) are concatenated.

The deconvolution layer (two-dimensional deconvolution layer) is used to amplify the feature map to increase the upper limit of identifying string length, wherein the feature map corresponds to having a plurality of time feature regions (timestep). In the embodiment, the timestep of the output layer is increased from 15 to 30. Afterwards, in the output layer of the character feature extraction layer, there are more time feature regions (timestep) to provide connectionist temporal classification (CTC) corresponding to the characters at each horizontal position in the feature map.

To further illustrate, the main purpose of the deconvolution layer is to increase the theoretical maximum string length that can be identified.

To further illustrate, in the sequence processing model, timestep usually refers to a time feature region (also called a time step) in the sequence. Each time feature region corresponds to an element in the sequence. For example, if we have a sentence "I like to eat apples," each word can be regarded as a timestep, and thus this sentence has six timesteps.

In which, the connectionist temporal classification (CTC) is a technique for processing the sequence data, especially suitable for dealing with inconsistent lengths of input and output. Since the output of each timestep (each area of the feature map) corresponds to one possible glyph, the CTC is used to determine which glyph each timestep should correspond to.

The deconvolution layer is connected to a character feature extraction layer. The character feature extraction layer extracts a character feature matrix for each time feature region of the feature map based on a plurality of character types. The character feature matrix includes at least an output channel quantity information, a vertical direction feature information and a horizontal direction feature information, wherein the output channel quantity information is a character type quantity, wherein the vertical direction feature information is the height of the time feature region, and wherein the horizontal direction feature information is the width of the time feature region.

As shown in FIG. 4C, it is the character feature extraction layer in the network architecture schematic (input→two-dimensional convolution layer (conv2D) convolution kernel 13×1 output channel 1024→rectified linear unit function (ReLU)→two-dimensional convolutional layer (conv2D) convolution kernel 1×30 output channels 36→rectified linear unit function (ReLU)→output layer (Output)). As can be seen from the figure, in the embodiment, a kernel of 13×1 size and a kernel of 1×30 size are used to extract the relevant information in the vertical and horizontal directions. The output channel quantity (channel) is 36, which corresponds to the possible 35 kinds of characters plus blank. The blank is a special character required for the training on CTC loss function, and the output matrix dimension is 1×36×13×30.

In which, the 13×1 convolution kernel mainly captures the features of the vertical direction of the image, while the 1×30 convolution kernel captures the features of the horizontal direction.

In which, the output channel quantity is 36, which means that the output has 36 independent feature maps. Each feature map is a different representation for the original input information. In the situation, these 36 channels correspond to the possible 35 characters plus a special character (blank) representing void. The blank glyph is necessary for the CTC loss function, which is used to represent a gap between different characters.

In which, the output channel quantity is 36, since 35 possible characters and a special blank symbol are used in the embodiments. These 35 possible characters usually include 26 English alphabets and 9 numbers (or which can vary based on the actual license plate system).

In which, the output matrix dimension is 1×36×13×30. The first dimension (1) is the batch size, which represents the quantity of pictures processed at the same time. In the embodiment, we process one picture at a time.

The second dimension (36) is the quantity of channels, which, as mentioned earlier, corresponds to 35 possible characters and one blank glyph.

The third and fourth dimensions (13 and 30) represent the height and width of the feature map respectively. This means that we have 13 different positions in the vertical direction and 30 different positions in the horizontal direction. Therefore, we have a total of 13×30=390 positions, and each position has a 36-dimensional vector to represent the information of the position.

The character feature extraction layer is connected to an average dimension reduction layer (ReduceMean). The average dimension reduction layer is used to obtain an average value of all vertical direction feature information (height) of the character feature matrix to output a dimension reduction character feature matrix.

To further illustrate, the average dimension reduction layer (ReduceMean) averages and reduces the dimension of the output of the previous layer for the third dimension (height) as the final output layer of the network. The output matrix dimension is 1×36×30, in which 36 corresponds to types of possible characters, and 30 corresponds to the time feature region (timestep) of the feature map.

The average dimension reduction layer is connected to an output layer. The output layer processes the dimension reduction character feature matrix through a connectionist temporal classification method. The output layer represents the result of operation by the neural network, which can be converted into corresponding strings through decoding processing afterwards.

The loss function in the embodiment uses the connectionist temporal classification (CTC), and trains the network through the Adam optimization method, wherein the initial learning rate is 0.0001, and the learning rate uses exponential decay. Decay rate per 20 epochs is 0.5, each batch size is 128 images, validation dataset is used for every 2 epochs, and a total of 100 epochs are trained. The weight having the highest validation rate during the training process is stored, and the weight is the final model weight after finishing the training.

As shown in Table 1 below, a 4×T matrix is used as an example of the analysis result information (each timestep feature values) output from the output layer, and it is further illustrated how the output matrix (36×30) of the neural network is decoded into the final output string. In the embodiments, the vertical axis is for each character, the horizontal axis is for timesteps, the possible character type (A~C+blank) is 4, the quantity of timesteps is T, ε stands for the blank character, and the numbers in the matrix represent the probabilities, in which each timestep corresponds to one column, and the sum of each column is 1 (the sum of all possibilities is 1). Table 1 illustrates the matrix values (analysis result information) through the network output layer, which have not yet been converted to final strings. Therefore, decoding processing is needed to convert these results into corresponding strings.

TABLE 1

| Output Matrix Table | | | | | |
| --- | --- | --- | --- | --- | --- |
| | t = 1 | t = 2 | t = 2 | ... | ... | t = T |
| ε | 0.2 | 0.4 | 0.1 | | |
| A | 0.7 | 0.1 | 0.3 | | |
| B | 0.1 | 0.3 | 0.1 | | |
| C | 0.0 | 0.2 | 0.5 | | |

The license plate identification module 1213 is connected to the license plate data storage module 1211 and the neural network model, and is used to input the license plate picture file to be identified into the neural network model for outputting an analysis result information (outputting each timestep feature value).

The decoding output module 1214 is connected to the license plate identification module 1213, and is used to perform decoding on the analysis result information through a decoding algorithm for obtaining an identification license plate character content. The decoding algorithm is a series of operations of specific rules, such as avaricious algorithm (Greedy algorithm) or directional search algorithm (Beam Search).

The decoding output module 1214 identifies each time feature region output by the output layer as a character through the decoding algorithm, and removes consecutive characters and blanks to obtain the identification license plate character content.

To further illustrate, the decoding algorithm processes each time feature region (timestep) sequentially, and calculates the character corresponding to the maximum value, which represents the character identified by the time feature region (timestep). After processing each time feature region (timestep), the respective characters are concatenated, and consecutive characters and blanks are removed to obtain the final output result.

The decoding technology of the subject application will be explained with reference to the embodiment of Table 1. First, the first step is to extract the character with the highest probability at positions of each timestep. The highest probability of the first timestep is 0.7, and the corresponding character is A. For the second timestep, the character with the highest probability is E, and so on. The characters with the highest probability for all timesteps are recorded. The second step is to remove repeated characters in consecutive identical characters. For example, AAA is removed and corrected to "A", AABBBCC is corrected to "ABC". The third step is to remove blank characters to derive the final result.

In the embodiment of Table 1, for the first three timesteps, the string obtained in the first step is AεC, and the final result is "AC".

The method of directly taking the highest probability in the first step mentioned above is a feature of the Greedy algorithm, while the second and third steps are to cooperate with the rules of CTC, which are identical to Beam Search.

In addition, if the string obtained in the first step is AεCCCεBB, the repeated characters in consecutive identical characters (AεCCCεBB=>AεCεB) are removed in the second step, and blank characters are removed in the third step to obtain the final result (ACB).

In the experimental embodiment, 13630 license plate images are used for training the neural network, and 8800 license plate images are used for testing, which include 2300 double-character license plate images. The accuracy rate of single-row license plate images is 98.04%, and the accuracy rate of double-row license plate images is 94.69%.

The license plate identification method of the subject application, as shown in FIG. 5, includes the following steps:

(1) A server apparatus stores at least one license plate picture file to be identified and multiple license plate sample picture files, each of the license plate sample picture file has a label area, the image content of the label area is an image character feature, and the image character feature is a double-row character 501;

(2) The server apparatus is used to perform deep learning training on the label areas of multiple license plate sample picture files to generate a neural network model 502;

(3) The server apparatus is used to input the license plate picture file to be identified into the neural network model to output an analysis result information 503;

(4) The server apparatus is used to perform decoding on the analysis result information through a decoding algorithm to obtain an identification license plate character content 504.

Compared with other conventional technologies, the license plate identification system and its method provided by the present invention provide the following advantages:

(1) a relatively deep neural network is used as the backbone by the present invention. Through the training process, the network not only extracts character features from images, but also rearranges single-row and double-row image character features to a certain degree so that its feature map sequences the character features in the image. When entering the final output layer, the process will be performed in a way that is generally used for single-row text identification.

(2) The neural network used in the present invention can not only be applied to the license plate with single-row characters, but also provides a highly identification ability for the license plate with double-row characters.

(3) Compared with the conventional method of identifying the license plate with double-row characters, the present invention does not need to identify the upper and lower rows separately, but can identify both rows simultaneously, so as to effectively reduce the time and cost for identification.

The present invention has been disclosed by the foregoing embodiments, which are not intended to limit the invention. Any person of ordinary knowledge in the art may make certain changes and modifications in understanding the foregoing technical features and embodiments of the present invention without departing from the spirit and scope of the present invention. Accordingly, the scope of patent protection for the invention shall be as defined in the claim attached hereto.

REFERENCE NUMERALS

1: Server Apparatus
11: Processor
12: Computer-Readable Recording Medium
121: Application Program
1211: License Plate Data Storage Module
1212: Neural Network Learning Module
1213: License Plate Identification Module
1214: Decoding Output Module
2: License Plate Body
21: Label Area

9

10

What is claimed is:

1. A license plate identification system, comprising:

at least one server apparatus, comprising at least:

a license plate data storage module, storing at least one license plate picture file to be identified and a plurality of license plate sample picture files, wherein each of the license plate sample picture files comprises a label area, and image content of the label area is an image character feature, the image character feature is a double-row character or a single-row character;

a neural network learning module, connected to the license plate data storage module, used to perform deep learning training on the label area of the license plate sample picture files to generate a neural network model;

a license plate identification module, connected to the license plate data storage module and the neural network learning module, used to input the license plate picture file to be identified into the neural network model for outputting an analysis result information; and a decoding output module, connected to the license plate identification module, used to perform decoding on the analysis result information through a decoding algorithm for obtaining an identification license plate character content;

wherein the neural network model comprises at least a plurality of convolutional layers and a deconvolutional layer, wherein the plurality of convolutional layers image extract image content of the label area as a feature map for rearranging character features in the image content, and the deconvolution layer is used to amplify the feature map to increase upper limit of identifying string length, wherein the feature map corresponds to having a plurality of time feature regions;

wherein the deconvolution layer is connected to a character feature extraction layer, the character feature extraction layer extracts a character feature matrix for each time feature region of the feature map based on a plurality of character types, and the character feature matrix at least comprises an output channel quantity information, a vertical direction feature information and a horizontal direction feature information, wherein the output channel quantity information is a character type quantity, wherein the vertical direction feature information is height of the time feature region, and wherein the horizontal direction feature information is width of the time feature region.

2. The license plate identification system according to claim 1, wherein the identification license plate character content corresponds to license plate code on the license plate picture file to be identified, and the license plate code is the single-row character or the double-row character.

3. The license plate identification system according to claim 1, wherein the decoding algorithm is an avaricious algorithm or a directional search algorithm.

4. The license plate identification system according to claim 1, wherein the character feature extraction layer is connected to an average dimension reduction layer, and the average dimension reduction layer is used to obtain an average value of all vertical direction feature information of the character feature matrix to output a dimension reduction character feature matrix.

5. The license plate identification system according to claim 4, wherein the average dimension reduction layer is connected to an output layer, the output layer processes the dimension reduction character feature matrix through a connectionist temporal classification method to output the analysis result information, and the decoding output module identifies each time feature region as a character through the decoding algorithm and removes consecutive characters and blanks to obtain the identification license plate character content.

6. A license plate identification method, comprising steps of:

storing at least one license plate picture file to be identified and a plurality of license plate sample picture files by a server apparatus, wherein each of the license plate sample picture files comprise a label area, image content of the label area is an image character feature, and the image character feature is a double-row character;

performing deep learning training on the label area of the plurality of license plate sample picture files by the server apparatus to generate a neural network model;

inputting the license plate picture file to be identified into the neural network model by the server apparatus to output an analysis result information; and performing decoding on the analysis result information through a decoding algorithm by the server apparatus to obtain an identification license plate character content;

wherein the neural network model comprises at least a plurality of convolution layers, a deconvolution layer, a character feature extraction layer, an average dimension reduction layer and an output layer, the plurality of convolutional layer extract image content of the label area as a feature map having a plurality of time feature regions to rearrange character features in the image content, the deconvolution layer is used to amplify the feature map, the character feature extraction layer is used to extract a character feature matrix for each time feature region of the feature map, the average dimension reduction layer is used to reduce dimension of the character feature matrix and output a dimension reduction character feature matrix, and the output layer processes the dimension reduction character feature matrix through a connectionist temporal classification method to output the analysis result information, then identifies each time feature region as a character through the decoding algorithm, and removes consecutive characters and blanks to obtain the identification license plate character content.

* * * * *